A. J. ROWAN.
LUBRICANT CONTROLLING DEVICE FOR AUTOMATICALLY CONTROLLING THE LUBRICATING SYSTEM OF GAS ENGINES OF AUTOMOBILES AND OTHER MOTOR VEHICLES.
APPLICATION FILED AUG. 26, 1921.

1,421,995.

Patented July 4, 1922.

Inventor
Alfred J. Rowan,
By
Attorney

UNITED STATES PATENT OFFICE.

ALFRED J. ROWAN, OF SAULT STE. MARIE, MICHIGAN.

LUBRICANT-CONTROLLING DEVICE FOR AUTOMATICALLY CONTROLLING THE LUBRICATING SYSTEM OF GAS ENGINES OF AUTOMOBILES, AND OTHER MOTOR VEHICLES.

1,421,995.  Specification of Letters Patent.  Patented July 4, 1922.

Application filed August 26, 1921. Serial No. 495,638.

*To all whom it may concern:*

Be it known that I, ALFRED J. ROWAN, (who has declared his intention to become a citizen of the United States), residing at Sault Ste. Marie, in the county of Chippewa and State of Michigan, have invented new and useful Improvements in Lubricant-Controlling Devices for Automatically Controlling the Lubricating System of Gas Engines of Automobiles and Other Motor Vehicles, of which the following is a specification.

The invention relates to a lubricant controlling device for automatically controlling the lubricating system of gas engines of automobiles and other motor vehicles.

The object of the present invention is to provide simple, practical and efficient means of strong, durable and comparatively inexpensive construction adapted to be readily applied to automobiles and various other motor vehicles employing the splash system of lubrication and capable of automatically maintaining the oil within the crank case of an automobile engine at a predetermined depth.

A further object of the invention is to provide a lubricant controlling device of this character capable of automatically maintaining a constant predetermined level of lubricant within a crank case regardless of whether the automobile is in a horizontal position or is tilted forwardly or rearwardly or laterally to either side.

With these and other objects in view, the invention consists in the construction and novel combination and arrangement of parts hereinafter fully described and illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate the corresponding parts in the several figures;—

Figure 1:
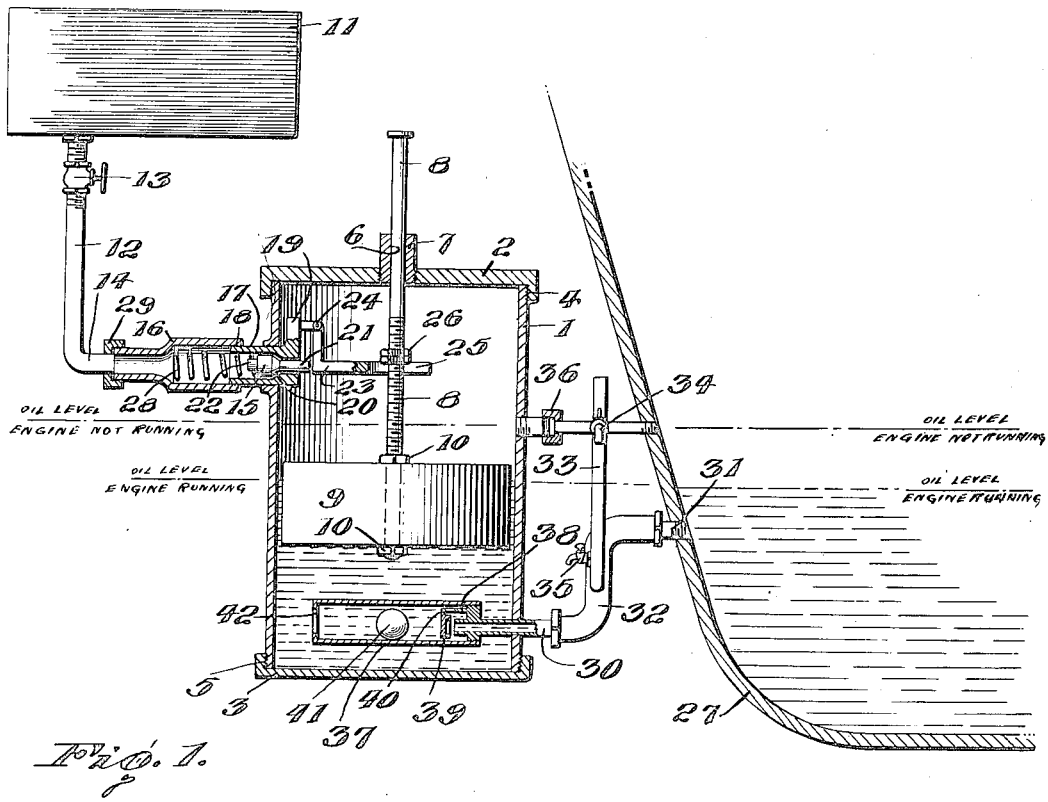
Figure 1 is a vertical sectional view of a lubricant controlling device constructed in accordance with this invention.
Figure 2:
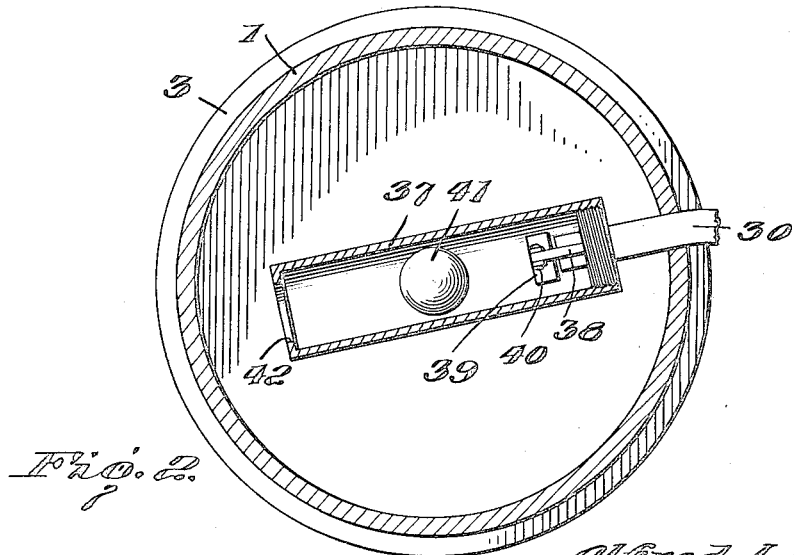
Figure 2 is a horizontal sectional view through the lower portion of the cylinder illustrating the diagonal arrangement of the intake of the pipe for connecting the cylinder with the crank case.

In the accompanying drawing, in which is illustrated the preferred embodiment of the invention, 1 designates a vertical cylinder constructed of any suitable material and equipped at its upper and lower ends with removable heads or caps 2 and 3 preferably flanged and threaded on the ends of the cylinder as indicated at 4 and 5, but the heads or caps may be secured to the ends of the cylinder in any other desired manner. While the cylindrical receptacle 1 is shown, the receptacle may be of any other desired form, as will be readily understood. The head or cap 2 at the upper end of the cylinder is provided with a central opening 6 and is equipped thereat with an upwardly projecting tubular extension or sleeve 7 through which passes a vertically slidable rod 8 of a float 9 rigidly secured to the rod 8 at the lower end thereof by nuts 10 or other suitable fastening means. The cylinder 1 receives lubricant from a supply tank 11 located above the level of the tank and connected with the same by a supply pipe 12 provided adjacent the tank with a controlling valve 13 and having a horizontal arm or portion 14 connected with the casing of an automatically closable valve 15. The casing of the valve 15 is preferably composed of two sections 16 and 17, having a threaded connection with each other at 18. The section 17 extends through the wall of the cylinder 1 from the interior thereof and is provided with an arm or lug 19 approximately L shaped and extending upwardly from the said section 17 and horizontally towards the rod 8 of a float. The valve body 15 which is in the form of a needle valve, has a tapered portion to fit a seat 20 of the section 17 of the valve casing and it is adapted to make an oil-tight joint or connection when closed. The valve body is provided with inner and outer reduced portions 21 and 22, the inner reduced portion projecting through the inner end of the section 17 and extending beyond the same and adapted to be engaged by an angle lever 23 fulcrumed at the outer end of one of its arms at 24 to the lug 19 and provided in its other arm with a longitudinal slot or opening 25 through which the rod 8 of the float passes. The rod 8 is equipped with adjustable nuts 26 located above the slotted arm of the angle lever and forming a shoulder for engaging the said slotted arm to swing the lever downwardly and cause the said lever to engage the extension 21 of the valve body 19 to open the valve when the lubricant within the cylinder descends below a predetermined level, whereby the float and the valve are adapted to maintain a constant predetermined level of lubricant within the cylinder and within a crank case 27 connected with the cylinder. The nuts 26 form an adjustable abutment for enabling the float to be properly positioned to maintain the desired level of lubricant within the cylinder and the said crank case. Also one of the nuts is adapted to lock the other to prevent accidental movement of the nuts after the same have been properly set. The section 16 of the casing receives a coiled spring 28 which bears against the valve body 15 and into which the outer extension 22 of the valve body projects. In practice, the float will preferably be weighted sufficiently to arrange its upper face substantially flush with the level of the lubricant and when the lubricant rises to the predetermined level the nut 26 will be raised clear of the angle lever and the spring will automatically close the valve and shut off the supply of lubricant. The valve will be maintained firmly in its closed position both by the pressure of the lubricant exteriorly of the valve and the coiled spring 28. The section 16 of the valve casing is connected by a suitable coupling 29 with the horizontal arm 14 of the lubricant supply pipe 12. The valve 13 which may be of any desired construction, is adapted to control the flow of lubricant from the superimposed tank or reservoir 11.

The lower portion of the cylinder is connected with the tank by a pipe composed of sections or members 30 and 31 and a connecting member 32 of double elbow shape. The members of the pipe connection are coupled together by threaded connections and the elbow connecting member is also connected with the lower end of a vertical pipe 33 provided with upper and lower pet cocks 33 and 35 adapted to enable the level of the lubricant within the crank case to be readily ascertained and also adapted for draining off the lubricant if desired. The vertical pipe is suitably supported at its upper portion by a threaded connection 36 consisting of a coupling or union carried upper portion of the pipe 33 and engaging a threaded lug or projection of the cylinder, as shown, but any other suitable means may of course be employed for this purpose.

The connecting pipe which extends from the crank case to the cylinder has a diagonally disposed intake 37 located within the cylinder which is preferably arranged at the right hand side of the rear end of the crank case. The inlet end of the connecting pipe is provided with an arm or lug 38 from which is hung a depending weighted valve 39 hinged or pivoted at 40 to the said lug. The said inlet end of the member 30 of the connecting pipe is preferably provided with a bevel or cone seat and the hinged weighted valve is shaped to fit the seat and normally hangs in an open position in spaced relation with the seat, as clearly shown in Figure 1 of the drawings. The intake 37 receives a movable weight 41 which is preferably in the form of a ball and which is confined within the intake 37 between the flanged end 42 thereof and the said valve 39. When the automobile tilts forwardly in descending a hill the ball 41 will roll into engagement with the valve 39 and close the same to prevent excess of oil from flowing from the cylinder into the crank case and should the automobile tilt in the opposite direction only a comparatively small amount of the lubricant will leave the crank case and fill the cylinder. Immediately upon the machine resuming a level position, the lubricant will maintain its level automatically. Also, should the machine tilt laterally to the left, the ball 41, owing to the diagonal position of the intake 37, will operate to close the valve and shut off the lubricant from the crank case. The tilting of the machine laterally in the opposite direction will permit only a slight amount of oil, sufficient to fill the cylinder, to leave the crank case.

The device which is entirely automatic in its operation, is adapted to reduce the consumption of oil to a minimum and it is adapted to maintain at maximum efficiency an engine employing the splash system of lubrication. Actual tests of the device in hilly country and over rough roads has demonstrated that under no condition will there be a variation of more than one-quarter of an inch in the level of the oil in the crank case and that the device automatically takes care of this under all conditions of road levels. In setting the adjustable stop of the float, the level of the oil for the average four cylinder car should allow one and one-fourth inches of a lower level of the oil in the crank when the engine is running than when the engine is stationary. The device operates only when the car is running and when a new supply of oil is required to replace that which is consumed and is not open to the objection of devices which feed lubricant to the crank case at all times and especially at times when a fresh supply of oil is not required.

What is claimed is:—

1. A lubricating controlling device of the class described including a receptacle, means for automatically maintaining the oil within the receptacle at a predetermined level, a connecting pipe for connecting the receptacle with a crank case, and gravity acting means for closing the connecting pipe when the same is tilted either longitudinally or laterally.

2. A lubricant controlling device of the class described including a receptacle, means for automatically maintaining the oil within the receptacle at a predetermined level, a connecting pipe for connecting the receptacle with a crank case, and gravity acting means for closing the connecting pipe when the same is tilted, said means including a hinged valve normally spaced from the end of the connecting pipe and a movable weight arranged to engage the valve.

3. A lubricant controlling device of the class described including a receptacle, means for automatically maintaining the oil within the receptacle at a predetermined level, a connecting pipe for connecting the receptacle with a crank case, and gravity acting means for closing the connecting pipe when the same is tilted, said means including a diagonally disposed horizontal intake, a valve and a movable weight operating within the intake and arranged to engage the valve.

4. In a lubricant controlling device of the character described, the combination with a crank case of a relatively small receptacle connected at the lower portion with the crank case, means for automatically maintaining a predetermined lubricant level within the receptacle, a pipe connecting the receptacle with the crank case and provided with a vertical indicator pipe having pet cocks located at different levels, and gravity acting means for closing the connecting pipe when the same is tilted.

5. In a lubricant controlling device of the character described, the combination with a crank case of a relatively small receptacle connected at the lower portion with the crank case, means for automatically maintaining a predetermined lubricant level within the receptacle, a connecting pipe connecting the receptacle with the crank case and provided within the receptacle with an intake, a support located within the intake, a weighted valve normally suspended adjacent the end of the connecting pipe but spaced therefrom hinged from the support and arranged to close the connecting pipe, and a movable weight operating within the intake and arranged to be carried into engagement with the valve by the tilting of the intake.

6. In a lubricant controlling device of the class described, the combination with a crank case of a receptacle at the lower portion with the crank case, means for maintaining a predetermined lubricant level within the receptacle, a pipe connecting the crank case with the receptacle and having its inlet end within the receptacle, and a weighted valve and means for engaging the same to close the valve within the intake end of the pipe.

In testimony whereof I hereunto set my hand.

ALFRED J. ROWAN.